US009621495B1

(12) United States Patent
Shumate

(10) Patent No.: US 9,621,495 B1
(45) Date of Patent: Apr. 11, 2017

(54) ANONYMOUS MESSAGING PROXY

(71) Applicant: Jeffrey Brian Shumate, Park City, UT (US)

(72) Inventor: Jeffrey Brian Shumate, Park City, UT (US)

(*) Notice: Subject to any disclaimer, the term of this patent is extended or adjusted under 35 U.S.C. 154(b) by 560 days.

(21) Appl. No.: 14/101,284

(22) Filed: Dec. 9, 2013

Related U.S. Application Data

(60) Provisional application No. 61/735,471, filed on Dec. 10, 2012.

(51) Int. Cl.
*H04L 12/58* (2006.01)
(52) U.S. Cl.
CPC .................. *H04L 51/046* (2013.01)
(58) Field of Classification Search
CPC ....................................... H04L 51/046
See application file for complete search history.

(56) References Cited

U.S. PATENT DOCUMENTS

| 5,930,479 | A * | 7/1999 | Hall | H04L 29/06 709/206 |
| 6,661,799 | B1 * | 12/2003 | Molitor | H04L 29/12009 370/392 |
| 7,450,499 | B2 * | 11/2008 | Park | H04L 12/66 370/229 |
| 7,609,701 | B2 * | 10/2009 | Yang | H04L 29/12066 370/395.52 |
| 7,715,413 | B2 * | 5/2010 | Vaziri | H04L 29/06027 370/230 |
| 7,912,046 | B2 * | 3/2011 | Li | H04L 29/12009 370/389 |
| 7,930,429 | B2 * | 4/2011 | Maloo | H04L 29/12066 709/219 |
| 8,005,093 | B2 * | 8/2011 | Huang | H04L 29/12066 370/338 |
| 8,046,452 | B2 * | 10/2011 | Hovell | H04L 29/06 709/201 |
| 8,244,876 | B2 * | 8/2012 | Sollee | H04L 29/06 370/401 |
| 8,451,711 | B1 * | 5/2013 | O'Toole, Jr. | H04L 67/2814 370/216 |

(Continued)

FOREIGN PATENT DOCUMENTS

WO    WO 2008133492 A1 * 11/2008 .......... H04W 76/025

*Primary Examiner* — Uzma Alam
(74) *Attorney, Agent, or Firm* — Maschoff Brennan

(57) ABSTRACT

An example embodiment includes a method of employing an anonymous message (AM) proxy to facilitate anonymous communication between parties. The method includes creating a channel associated with a first actual address of a first party. The method also includes assigning a channel address to the channel. The method further includes receiving a channel access request at the channel address from a second actual address of a second party. The method also includes assigning a first proxy address to the first actual address and a second proxy address to the second actual address. The method further includes mapping a first address pair to a second address pair for the channel. The first address pair includes the first proxy address and the first actual address. The second address pair includes the second proxy address and the second actual address. The method also includes sending the second proxy address to the second actual address.

20 Claims, 10 Drawing Sheets

(56) References Cited

U.S. PATENT DOCUMENTS

| | | | | |
|---|---|---|---|---|
| 8,725,883 B2* | 5/2014 | Noyranen | H04L 29/12509 | 370/328 |
| 8,879,539 B2* | 11/2014 | Noldus | H04W 76/025 | 370/352 |
| 2002/0133582 A1* | 9/2002 | Shibata | H04L 29/12009 | 709/223 |
| 2002/0154624 A1* | 10/2002 | Oishi | H04L 29/06 | 370/350 |
| 2003/0185207 A1* | 10/2003 | Nakahara | H04L 29/12367 | 370/389 |
| 2003/0219023 A1* | 11/2003 | Miyata | H04L 29/12358 | 370/395.53 |
| 2004/0047340 A1* | 3/2004 | Ruckstuhl | H04L 12/46 | 370/352 |
| 2004/0076180 A1* | 4/2004 | Satapati | H04L 12/4604 | 370/467 |
| 2004/0093434 A1* | 5/2004 | Hovell | H04L 29/06 | 709/249 |
| 2004/0103212 A1* | 5/2004 | Takeuchi | H04L 29/12066 | 709/245 |
| 2004/0153502 A1* | 8/2004 | Jiang | H04L 29/06 | 709/203 |
| 2004/0194106 A1* | 9/2004 | Ogawa | H04L 29/12066 | 718/100 |
| 2004/0233916 A1* | 11/2004 | Takeuchi | H04L 29/12066 | 370/395.54 |
| 2005/0125532 A1* | 6/2005 | Kimchi | H04L 29/06 | 709/225 |
| 2005/0232272 A1* | 10/2005 | Deng | H04L 12/18 | 370/390 |
| 2005/0232273 A1* | 10/2005 | Suzuki | H04L 12/2803 | 370/392 |
| 2005/0281258 A1* | 12/2005 | Takahara | H04L 12/28 | 370/389 |
| 2006/0047821 A1* | 3/2006 | Kim | H04L 69/162 | 709/227 |
| 2006/0195613 A1* | 8/2006 | Aizu | H04L 41/0226 | 709/246 |
| 2006/0215654 A1* | 9/2006 | Sivakumar | H04L 29/12415 | 370/389 |
| 2007/0153812 A1* | 7/2007 | Kemp | H04L 29/12509 | 370/401 |
| 2009/0074002 A1* | 3/2009 | Kam | H04L 29/12584 | 370/429 |
| 2010/0080240 A1* | 4/2010 | Corbel | H04L 61/256 | 370/401 |
| 2010/0091768 A1* | 4/2010 | Gilbert | H04L 29/12094 | 370/352 |
| 2010/0115080 A1* | 5/2010 | Kageyama | H04L 29/12028 | 709/223 |
| 2010/0145602 A1* | 6/2010 | Morris | G06F 9/4443 | 701/532 |
| 2010/0274923 A1* | 10/2010 | Dean | H04L 29/12396 | 709/238 |
| 2010/0312901 A1* | 12/2010 | Noyranen | H04L 29/12509 | 709/228 |
| 2011/0019547 A1* | 1/2011 | De Lutiis | H04L 29/12207 | 370/231 |
| 2011/0235095 A1* | 9/2011 | Kudo | H04N 1/32614 | 358/1.15 |
| 2011/0270924 A1* | 11/2011 | Johnsson | H04L 29/12433 | 709/204 |
| 2012/0016942 A1* | 1/2012 | Cherian | H04W 4/00 | 709/206 |
| 2012/0233478 A1* | 9/2012 | Mucignat | H04L 12/2825 | 713/320 |
| 2013/0097329 A1* | 4/2013 | Alex | H04L 61/1511 | 709/228 |
| 2013/0232492 A1* | 9/2013 | Wang | H04L 61/103 | 718/1 |
| 2014/0297877 A1* | 10/2014 | Sabatier | H04L 29/12528 | 709/227 |

* cited by examiner

Channel Table 302

| Channel 304 | Initial Party 306 | Actual Address 308 | Channel Type 312 | Channel Address 350 | Key Code 310 |
|---|---|---|---|---|---|
| First Channel 304A | First Party 102A | 18012222222 308A | SMS 312A | 18014451255 350A | "TIRES" 310A |
| Second Channel 304B | First Party 102A | user1@gmail.com 308B | e-mail 312B | chan2@smsm.com 350B | NA 310B |
| ⋮ | ⋮ | ⋮ | ⋮ | ⋮ | ⋮ 360 |
| Nth Channel 304C | Third Party 102C | 12065552525 308C | Voice Communication 312C | 18012222283 350C | Ext. 211 310C |

*Fig. 3A*

First Channel Table 326A

| Initial Party 306 | Actual Address 308 | Proxy Address 314 | Respondents 316 | Actual Address 320 | Proxy Address 318 | Mapped Address Pairs 322 | Information 324 |
|---|---|---|---|---|---|---|---|
| First Party 102A | 1801222222 308A | 1801222247 314A | Second Party 102B | 1801222268 320A | 1801222260 318A | 1801222222: 1801222247/ 1801222260: 1801222268 322A | Disable 324A |
| First Party 102A | 1801222222 308A | 1801222252 314B | Third Party 102C | 1801222273 320B | 1801222265 318B | 1801222222: 1801222252/ 1801222265: 1801222273 322B | |
| First Party 102A | 1801222222 308A | 1801222257 314C | Fourth Party 316C | 1801222278 320C | 1801222270 318C | 1801222222: 1801222257/ 1801222270: 1801222278 322C | |
| ... | ... | ... | ... | ... | ... | ... | ... |
| First Party 102A | 1801222222 308A | 1801222262 314D | Nth Party 316D | 1801222283 320D | 1801222275 318D | 1801222222: 1801222262/ 1801222275: 1801222283 322D | Disable 324D |

*Fig. 3B*

| Second Channel Table 326B | | | | | | | |
|---|---|---|---|---|---|---|---|
| Initial Party 306 | Actual Address 308 | Proxy Address 314 | Respondents 316 | Actual Address 320 | Proxy Address 318 | Mapped Address Pairs 322 | Information 324 |
| First Party 102A | user1@gmail.com 308B | user2@amsm.com 314E | Second Party 102B | resp1@msn.com 320E | user6@amsm.com 318E | user1@gmail.com: user2@amsm.com/ user6@amsm.com: resp1@msn.com 322E | Initial Message 324E |
| First Party 102A | user1@gmail.com 308B | user3@amsm.com 314F | Third Party 102C | resp2@gmail.com 320F | user7@amsm.com 318F | user1@gmail.com: user3@amsm.com/ user7@amsm.com: resp2@gmail.com 322F | Initial Message 324E |
| First Party 102A | user1@gmail.com 308B | user4@amsm.com 314G | Sixth Party 316G | resp3@yahoo.com 320G | user8@amsm.com 318G | user1@gmail.com: user4@amsm.com/ user8@amsm.com: resp3@yahoo.com 322G | Initial Message 324E |
| ⋮ | ⋮ | ⋮ | ⋮ | ⋮ | ⋮ | ⋮ | ⋮ |
| First Party 102A | user1@gmail.com 308B | user5@amsm.com 314H | Mth Party 316H | resp4@msn.com 320H | user9@amsm.com 318H | user1@gmail.com: user5@amsm.com/ user9@amsm.com: resp4@msn.com 322H | Initial Message 324E |

*Fig. 3C*

| Nth Channel Table 326C ||||||||
|---|---|---|---|---|---|---|---|
| Initial Party 306 | Actual Address 308 | Proxy Address 314 | Respondents 316 | Actual Address 320 | Proxy Address 318 | Mapped Address Pairs 322 | Information 324 |
| Third Party 102C | 12065552525 308C | 12065552550 314I | Seventh Party 316I | 12065552571 320I | 12065552563 318I | 12065552525: 12065552550/ 12065552563: 12065552571 322I | First Broadcast Message 324I |
| Third Party 102C | 12065552525 308C | 12065552555 314J | Eighth Party 316J | 12065552576 320J | 12065552568 318J | 12065552525: 12065552555/ 12065552568: 12065552576 322J | Second Broadcast Message 324J |
| Third Party 102C | 12065552525 308C | 12065552560 314K | Ninth Party 316K | 12065552581 320K | 12065552573 318K | 12065552525: 12065552560/ 12065552573: 12065552581 322K | Second Broadcast Message 324J |
| ⋮ | ⋮ | ⋮ | ⋮ | ⋮ | ⋮ | ⋮ | ⋮ |
| Third Party 102C | 12065552525 308C | 12065552565 314L | Lth Party 316L | 12065552586 320L | 12065552578 318L | 12065552525: 12065552565/ 12065552578: 12065552586 322L | Frist Broadcast Message 324I |

*Fig. 3D*

ANONYMOUS MESSAGING PROXY

CROSS-REFERENCE TO A RELATED APPLICATION

This patent application claims the benefit of and priority to U.S. Provisional Patent Applications No. 61/735,471 filed Dec. 10, 2012, which is incorporated herein by reference in its entirety.

FIELD

Embodiments described herein relate generally to communications. More particularly, some example embodiments relate to anonymous messaging via a proxy.

BACKGROUND

In some circumstances parties may want to anonymously communicate. For example, a first party may be interested in selling an item. The first party may want other parties to communicate with her regarding the item but may want to discontinue communication with the other parties following the sale of the item. Additionally, the first party may desire to limit access to her actual address.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF SOME EXAMPLE EMBODIMENTS

An example embodiment includes a method of employing an anonymous message (AM) proxy to facilitate anonymous communication between parties. The method includes creating a channel associated with a first actual address of a first party. The method also includes assigning a channel address to the channel. The method further includes receiving a channel access request at the channel address from a second actual address of a second party. The method also includes assigning a first proxy address to the first actual address and a second proxy address to the second actual address. The method further includes mapping a first address pair to a second address pair for the channel. The first address pair includes the first proxy address and the first actual address. The second address pair includes the second proxy address and the second actual address. The method also includes sending the second proxy address to the second actual address.

This Summary is provided to introduce a selection of concepts in a simplified form that are further described below. This Summary is not intended to identify key features or essential characteristics of the claimed subject matter, nor is it intended to be used as an aid in determining the scope of the claimed subject matter Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify certain aspects of the present invention, a more particular description of the invention will be rendered by reference to example embodiments thereof which are disclosed in the appended drawings. It is to be understood that the drawings are diagrammatic and schematic representations of such example embodiments, and are not limiting of the present invention, nor are they necessarily drawn to scale. Aspects of the invention will be described and explained with additional specificity and detail through the use of the accompanying drawings in which:

FIGS. 3A-3D illustrate example tables that may be included in an example database.

DETAILED DESCRIPTION OF SOME EXAMPLE EMBODIMENTS

Figure 1:
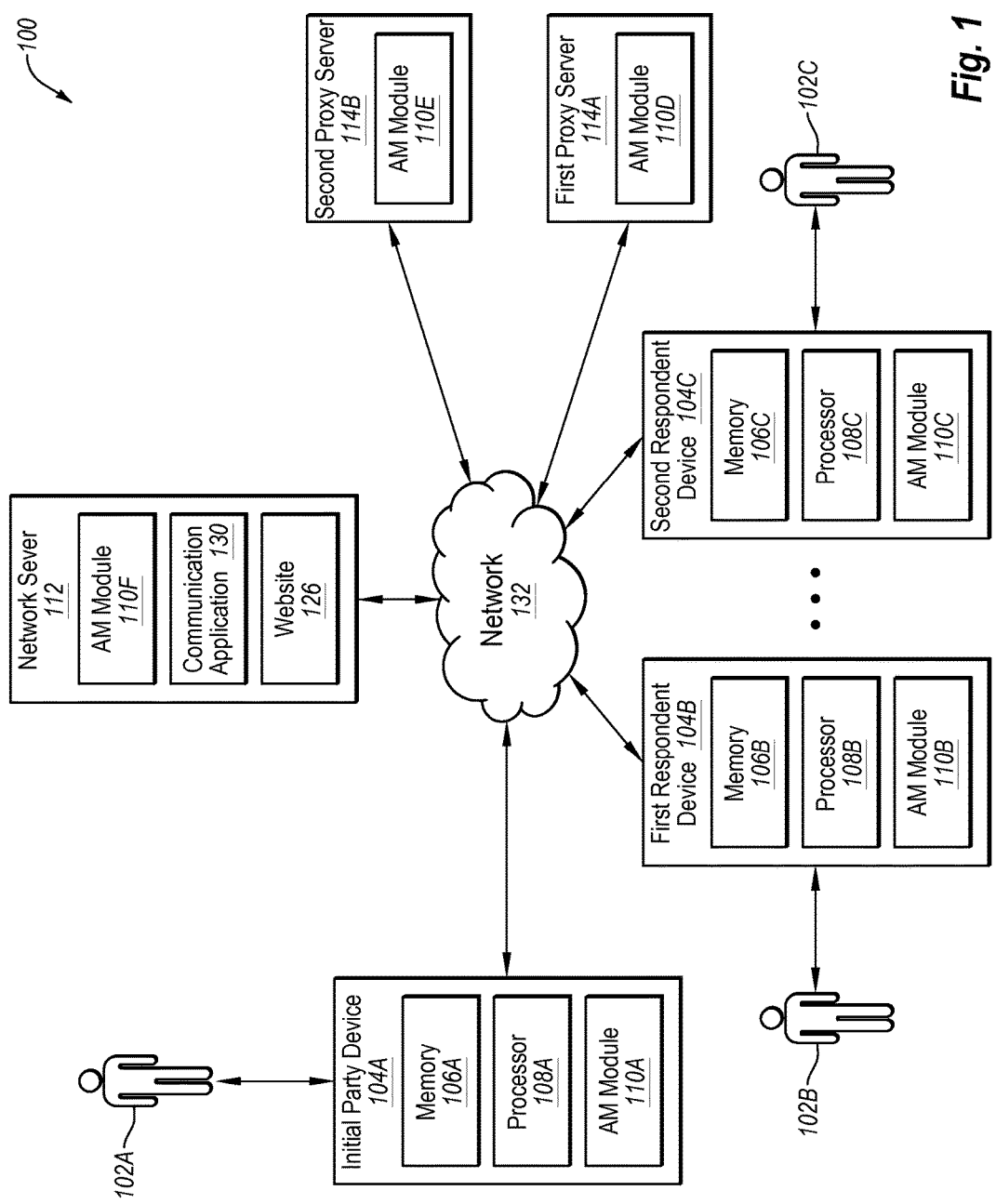
FIG. 1 illustrates an example anonymous messaging (AM) system.

Example embodiments discussed herein relate to anonymous messaging (AM) between parties. Some details of the embodiments are described with reference to the figures. FIG. 1 illustrates an example anonymous messaging (AM) system 100. The AM system 100 depicted in FIG. 1 may employ one or more proxy servers 114A and 114B (generally, proxy server 114 or proxy servers 114) to facilitate anonymous communication between parties 102A-102C (generally, party 102 or parties 102). In the AM system 100 a communication channel may be created for an initial party 102A. One or more respondent parties 102B and 102C may then request access to the channel. Proxy addresses may then be assigned to the initial party 102A and to the respondent parties 102B and 102C. During communication between the parties 102 on the channel, a transmitting party 102 transmits a message to the proxy address assigned to her. Additionally, a receiving party 102 receives the message from the proxy address assigned to her. Accordingly, the transmitting party 102 does not know an actual address of the receiving party 102 and the receiving party 102 does not know an actual address of the transmitting party 102.

Moreover, in the AM system 100, each of the parties 102 may control the communications she receives and information she reveals. Thus, in the AM system 100, privacy of each of the parties 102 and control of communications between the parties 102 may be bi-directional. Specifically, each of the parties 102 may disable, suspend, mute, prioritize, etc. communications between themselves and one or more of the parties 102. Additionally, once engaged with the AM system 100, each of the parties 102 may monitor and/or control use any actual information stored by the AM system 100.

The AM system 100 may be implemented as an independent network. For example, the components (e.g., 104, 112, and 114) may operate without direct authorization of a larger communication system. In these embodiments, the communication channel created in the AM system 100 may include, but is not limited to, a short message service (SMS) channel, a multimedia messaging service (MMS) channel, an email message channel, a voice communication channel, a web real time communication (webRTC) channel, an instant messaging (mobile, web browser-based, etc.) channel, a voice over internet protocol (VoIP) channel, a social media messaging channel, and an extensible messaging and presence protocol (XMPP) channel.

Alternatively, the AM system 100 may be included within or operate with another system. Accordingly, the channel may be established within the system using the communication sub-system implemented in the system. In these and other embodiments, the channel may include any of the above-referenced channel types or another channel type utilized in the sub-system. When implemented within another system, the AM system 100 may include additional components that enable interface with the system without departing from the scope of this disclosure. Additionally, a system operator that controls the system in which the AM system 100 is included may monitor communication along the channel. The system operator may monitor which of the parties 102 are communicating, durations of communications along the channel, frequencies of communications along the channel, and the like. The channels, and accordingly the monitoring of the channels, may include devices 104 associated with the parties 102.

For example, the AM system 100 may be implemented within a dating service that allows communication between clients. The channel may be implemented within a communication sub-system of the dating service. Each of the clients may use his or her personal email address as endpoints of the channel. The dating service may provide the proxy between the endpoints that facilitates anonymous communication between the clients. For instance, a first client communicates with a proxy address of a second client and the second client communicates with a proxy address of the first client. A dating service operator may monitor communications along the channels established between the clients. The dating service may thus monitor which clients are communicating, how often, and for how long. The dating service may monitor the communications along a channel even when the clients are using personal devices as endpoints of the channel.

The actual addresses and the proxy addresses (collectively, addresses) in the AM system 100 may take differing formats based on the type or types of channels created by the AM system 100. For example, in embodiments in which the channel includes an SMS channel, the addresses may include multi-digit mobile phone numbers. Likewise, in embodiments in which the channel includes an email message channel, the addresses may include email addresses. Some additional address formats may include an internet protocol (IP) address, another network location address, a phone number, a device number, another address that enables communication with a device, or some combination thereof.

As depicted in FIG. 1, the AM system 100 may include a network server 112, the proxy servers 114, and one or more devices 104A-104C (generally, device 104 or devices 104) communicatively connected via a network 132. One or more of the network sever 112, the proxy servers 114, and the devices 104 may communicate data via the network 132 to enable anonymous communication between the parties 102. In the depicted AM system 100, anonymous messaging (AM) modules 110A-110F (generally, AM module 110 or AM modules 110) may be included in the network sever 112, the proxy servers 114, and the devices 104. The AM modules 110 may be configured to facilitate anonymous communication between the parties 102 and/or enable communication of data in the AM system 100 related to anonymous communication, such as information used to create the channels. Each of the network server 112, the proxy servers 114, and the devices 104 in the AM system 100 is described in relationship to anonymous messaging performed by the AM modules 110.

The network 132 may be a conventional type network, wired or wireless, and may have numerous different configurations including, but not limited to, a star configuration, token ring configuration, or other configurations. Furthermore, the network 132 may include a local area network (LAN), a wide area network (WAN) (e.g., the Internet), and/or other interconnected data paths across which multiple devices may communicate. In some embodiments, the network 132 may be a peer-to-peer network. The network 132 may also be coupled to or include portions of a telecommunications network that may enable communication of data in a variety of different communication protocols. In some embodiments, the network 132 includes Bluetooth communication networks and/or a cellular communications networks for sending and receiving data including via SMS, MMS, hypertext transfer protocol (HTTP), direct data connection, WAP, email, etc.

Each of the parties 102 may be associated with one of the devices 104. For example, an initial party device 104A may be owned and/or routinely operated by an initial party 102A. Likewise, a first respondent 102B may own and/or routinely operate a first respondent device 104B and a second respondent 104C may own and/or routinely operate a second respondent device 104C. The devices 104 may be a computing device that include a processor 108A-108C (generally, processor 108 or processors 108), memory 106A-106C (generally, memory 106), and network communication capabilities. For example, the devices 104 may include a laptop computer, a desktop computer, a tablet computer, a mobile telephone, a personal digital assistant ("PDA"), a mobile email device, a portable game player, a portable music player, a television with one or more processors embedded therein or coupled thereto or other electronic device capable of accessing the network 132.

The devices 104 may include the AM modules 110A-110C. The AM modules 110A-110C or a portion thereof installed on the devices 104 may be configured enable interaction with the parties 102. Specifically, in some embodiments, the AM modules 110A-110C may be configured to receive a message authored by one of the parties 102 and communicate the message to the network server 112 and/or the proxy servers 114. The AM modules 110A-110C may additionally receive messages from the proxy servers 114 and/or the network server 112 and display, present, or otherwise communicate the message to one of the parties 102. Moreover, the AM modules 110A-110C may receive a request authored by one of the parties 102. The AM modules 110A-110C may then communicate the request to the network server 112 and/or the proxy servers 114.

The messages received by the AM modules 110A-110C and/or communicated to the parties 102 may include a broadcast message, an initial message, or any communication between the parties 102. The request may include, but is not limited to, a deletion request, a channel establishment request, or a channel access request. Some additional details of the broadcast message, the initial message, the deletion request, the channel establishment request, and the channel access request are discussed below.

The network server 112 can be a hardware server that includes a processor, memory, and communication capabilities. In the illustrated embodiment, the network server 112 may be coupled to the network 132 to send and receive data to and from one or more of the devices 104 and/or the proxy servers 114 via the network 132. The network server 112 may be configured to host a website 126 that is accessible via the network 132. Specifically, in some embodiments, the network server 112 allows access to the website 126 by the parties 102 using the devices 104 or other devices using an application such as a common web browser application. The parties 102 may accordingly interface with the website 126 using the devices 104 or other devices.

The network server 112 may include the AM module 110F. The AM module 110F on the network server 112 may provide a user interface to the parties 102 accessing the website 126. In particular, the AM module 110F may provide an interface through which a request or a message may be communicated to the network server 112, the proxy servers 114, the devices 104, or some combination thereof. For example, in some embodiments the network server 112 may include an interface on the website 126 that enables the initial party 102A to communicate a channel establishment request. Additionally, the network server 112 may include an interface on the website 126 that enables the initial party 102A to communicate an initial message. Additionally still, the network server 112 may include an interface on the website 126 that enables the initial party 102A or the respondent parties 102B and 102C to communicate a deletion request.

The network server 112 may host a network communication application 130. The communication application 130 may be configured to determine content on the website 126 and/or provide to the parties 102 a user interface through which the parties 102 may interface with the AM module 110F. For example, the communication application 130 may allow the parties 102 to view each channel and/or status of a channel (e.g., active, inactive, deleted, number of respondents, etc.) to which the parties 102 and/or the devices 104 have been granted access.

In some embodiments, the communication application 130 may be configured to interface with one or more cache memories (not shown). The cache memories may be configured to store some portion of the data communicated in the AM system 100. For example, the cache memories may be configured to store addresses mapped to a channel. The cache memories may enable efficient forwarding of communication in the AM system 100.

The proxy servers 114 can each be a hardware server that includes a processor, a memory, and network communication capabilities. In the illustrated embodiment, the proxy servers 114 are coupled to the network 132. The proxy servers 114 send and receive data to and from one or more of the devices 104, the network server 112, and the other of the proxy servers 114 via the network 132.

The proxy servers 114 may include AM modules 110D and 110E. The AM modules 110D and 110E in the proxy servers 114 may be configured to receive communications from the devices 104 of the parties 102 and forward the communications such that the parties 102 are unaware of the actual address from which the communications originated. Additionally, the AM modules 110D and 110E may be configured to receive messages and requests used to create channels in conjunction with the other AM modules 110A-110C and 110F of the devices 104 and the network server 112 of the AM system 100.

For example, the AM module 110D of a first proxy server 114A may receive a channel establishment request from the initial party 102A. The channel establishment request may request the AM module 110D to create a channel. In particular, the channel establishment request may request the AM module 110D to create a channel for an actual address associated with the initial party device 104A.

The initial party 102A may communicate the channel establishment request from the initial party device 104A to the first proxy server 114A via the network 132. Alternatively, the channel establishment request may be entered by the initial party 102A using the initial party device 104A or another device (not shown) in the website 126 of the network server 112, which may communicate the channel establishment request to the AM module 110D. Alternatively still, the initial party 102A may call an operator or administrator who communicates the channel establishment request to the AM module 110D. The channel establishment request may be communicated prior to creating the channel.

In some circumstances, the AM module 110D of the first proxy server 114A or the AM module 110F of the network server 112 may receive an initial message from the initial party 102A. The initial message may include a communication that may be sent to the respondent parties 102B and 102C upon being granted access to the channel. For example, if the channel is created for a specific purpose such as selling an item via a published advertisement, then the initial message may include some information about the item that may have been omitted from the published advertisement. The initial message may be associated with the channel by the AM module 110D or the AM module 110F, for example. By associating the initial message with the channel, the initial message may eventually be communicated to the respondent parties 102B and 102C. The initial message may be communicated from the initial party device 104A to the first proxy server 114A and/or to the network server 112 via the network 132. Alternatively, the initial party 102A may call an operator or administrator who communicates the initial message to the AM module 110D, the AM module 110F, or the network server 112.

The AM module 110 may then create a channel associated with the actual address of the initial party device 104A and/or the initial party 102A. Included in creating the channel, the AM module 110 may assign a channel address to the channel, which may be sent to the initial party 102A. For example, the AM module 110 may send the channel address to the initial party device 104A via the network 132. Alternatively, the channel address may be presented via the website 126 to the initial party 102A.

The channel address may additionally or alternatively be published or otherwise made available to the respondent parties 102B and 102C. For instance, the channel address may be included in a published advertisement. The AM module 110 may then receive a channel access request at the channel address from the first respondent party 102B and/or the second respondent party 102C. The channel access request may be sent from actual addresses of the first respondent device 104B or the second respondent device 104C, respectively.

The AM module 110 may then assign proxy addresses to the actual addresses of the devices 104. For example, in some embodiments, the AM module 110 may assign a first proxy address and a fourth proxy address to the actual address of the initial party device 104A. The AM module 110 may also assign a second proxy address to the actual address of the first respondent device 104B. Additionally, the AM module 110 may assign a third proxy address to the actual address of the second respondent device 104C. The AM module 110 may then form each of the proxy addresses and each of the actual addresses into address pairs and map the address pairs to one another.

For instance, a first address pair may include the first proxy address and the actual address of the initial party device 104A, a second address pair may include the second proxy address and the actual address of the first respondent device 104B, a third address pair may include the third proxy address and the actual address of the second respondent device 104C, and a fourth address pair may include the fourth proxy address and the actual address of the initial party device 104A. The first address pair may be mapped to the second address pair and the third address pair may be mapped to the fourth address pair.

In alternative embodiments, the AM module 110 may only assign a first proxy address to the actual address of the initial party device 104A. In these alternative embodiments, the AM module 110 may form fewer address pairs using the first proxy address for each address pair that includes the initial party device 104A. The AM module 110 may then map the address pairs as discussed above. For example, a first address pair may include the first proxy address and the actual address of the initial party device 104A, a second address pair may include the second proxy address and the actual address of the first respondent device 104B, and a third address pair may include the third proxy address and the actual address of the second respondent device 104C. The first address pair may be mapped to the second address pair and the first address pair may be mapped to the third address pair.

In either of the above embodiments, the AM module 110 may send the second proxy address to the actual address of the first respondent device 104B and the third proxy address to the actual address of the second respondent device 104C. Additionally, in circumstances in which the initial message is communicated to the AM module 110, the initial message may be sent to the actual address of the first respondent device 104B and to the actual address of the second respondent device 104C. In the AM system 100, the AM module may communicate the proxy addresses and/or the initial message via the network 132.

After the address pairs are mapped, to communicate between the parties 102, the proxy addresses are used, thereby facilitating anonymous communication in the AM system 100. For example, a communication may be authored by the initial party 102A using the initial party device 104A. The communication may then be sent to the first proxy address from the actual address of the initial party device 104A. The AM module 110A may then communicate the communication to the first proxy server 114A via the network 132. Because the communication is sent from the actual address of the initial party device 104A and sent to the first proxy address, the AM module 110 interprets the communication to be intended for the first respondent party 102B due to the mapping between the first address pair and the second address pair. Accordingly, in response to the AM module 110D of the first proxy server 114A receiving the communication sent from the actual address of the initial party device 104A and sent to the first proxy address, the AM module 110D forwards the communication from the second proxy address to the actual address of the first respondent device 104B. Likewise, a communication may be authored by the first respondent party 102B using the first respondent device 104B. The communication may be sent to the second proxy address from the actual address of the first respondent device 104B. The AM module 110B may communicate the communication to the first proxy server 114A via the network 132. Because the communication is sent from the actual address of the first respondent device 104B and sent to the second proxy address, the AM module 110 interprets the communication to be intended for the initial party 102A due to the mapping between the first address pair and the second address pair. Accordingly, in response to the AM module 110D of the first proxy server 114A receiving the communication sent from the actual address of the first respondent device 104B and sent to the second proxy address, the AM module 110D forwards the communication from the first proxy address to the actual address of the initial device 104A.

Thus, to a transmitting device 104 (e.g., the initial party device 104A), the actual address of the receiving device 104 is hidden because the transmitting device 104 sends the communication to an assigned proxy address. Additionally, to a receiving device 104 (e.g., the first respondent device 104B), the actual address of the transmitting device 104 is hidden because the first proxy server 114A sends the communication from an assigned proxy address.

In some embodiments, one or more of the parties 102 may communicate a deletion request to the AM module 110. In response, the AM module 110 may disable communication between address pairs mapped to an actual address of a device 104 associated with the party 102 on the channel. For example, if the first respondent party 102B communicated a deletion request from the actual address of the first respondent device 104B to the second proxy address, the AM module 110 may disable communications between the first address pair and the second address pair on the channel. When communication between the first address pair and the second address pair on the channel is disabled, communication between the third address pair and the fourth address pair on the channel may not be affected. The deletion request may be communicated via the network 132 to the first proxy server 114A using a device 104 that has an actual address included in the channel or via the website 126 using the device 104 or another device (not shown).

In some embodiments, one or more of the parties 102 may communicate a broadcast message to the AM module 110. In response, the AM module 110 may communicate the broadcast message via some or all mapped address pairs on the channel. For example, if the initial party 102A communicates a broadcast message, the AM module 110 may forward the broadcast message to the actual address of the first respondent device 104B from the second proxy address and the actual address of the second respondent device 104C from the third proxy address. For example, if the channel is established as an anonymous chat room, the broadcast message may communicate a post to each party 102 that is included in the anonymous chat room. The broadcast message may be communicated via the network 132 to the first proxy server 114A using a device 104 that has an actual address included in the channel or via the website 126 using the device 104 or using another device (not shown).

In some embodiments, a second proxy server 114B may be included in the depicted AM system 100. The second proxy server 114B may be located remotely from the first proxy server 114A. For example, the first proxy server 114A may be located in the United States of America and the second proxy server 114B may be located in Australia.

Using the second proxy server 114B, anonymous communication between the parties 104 may include multiple communication networks included in the network 132. For example, the initial party 102A may author a first communication using the initial party device 104A and send the first communication to the first proxy address via a first communication network. The first proxy server 114A may receive the first communication via the first communication network and forward the first communication to the second proxy server 114B via a second communication network. The second proxy server 114B may receive the first communication and recognize that the first communication is intended for the first respondent device 104B due to the mapping between the first address pair and the second address pair. The second proxy server 114B may then forward the first communication to the actual address of the first respondent device 104B from the second proxy address via a third communication network.

An example of the use of the second proxy server 114B in the AM system 100 may include a voice communication channel between the initial party device 104A and the first respondent device 104B. The initial party device 104A may be communicatively coupled to the first proxy server 114A via a first local telecommunications network located in the United States of America and the first respondent device 104B may be communicatively coupled to the second proxy server 114B via a second local telecommunications network located in Australia. Additionally, the first proxy server 114A may be communicative coupled to the second proxy server 114B across the ocean between the United States of America and Australia via the Internet. Accordingly, a first communication may be sent locally in the United States of America from the initial party device 104A to the first proxy server 114A on the first local telecommunications network, then communicated across the ocean via the Internet from the first proxy server 114A to the second proxy server 114B, and then communicated locally in Australia to the first respondent device 104B via the second telecommunications network. In this example, the initial party device 104A may be communicatively coupled to the first respondent device 104B without incurring long-distance charges associated with the use of a telecommunications network that spans the ocean between the United States of America and Australia.

Modifications, additions, or omissions may be made to the AM system 100 without departing from the scope of the present disclosure. For example, while FIG. 1 depicts three devices 104, the present disclosure applies to an AM system architecture having one or more devices 104. Furthermore, while FIG. 1 includes one network server 112 and two proxy servers 114, the AM system 100 may include multiple network servers and/or a single or multiple proxy servers.

Moreover, the separation of various components and servers in the embodiments described herein should not be understood as requiring such separation in all embodiments, and it should be understood with the benefit of this disclosure that the described components and servers can generally be integrated together in a single component or server or separated in to multiple components or servers.

The AM module 110 can be code and routines for facilitating anonymous communication between the parties 102. In some embodiments, the AM module 110 acts in part as a thin-client application that may be stored on one or more of the devices 104 and in part as components that may be stored on one or more of the servers of the AM system 100. In some embodiments, the AM module 110 can be implemented using hardware including a field-programmable gate array ("FPGA") or an application-specific integrated circuit ("ASIC"). In some other instances, the AM module 110 can be implemented using a combination of hardware and software. In some embodiments, the AM module 110 may be stored in a combination of the devices 104 and servers (e.g., 112, 114A, and/or 114B), or in one of the devices or servers.

In the AM system 100, memory (e.g., the memory 106 and/or memory included in one or more of the servers 112 and 114) can be a non-transitory memory that stores data for providing the functionality described herein. The memory may be included in storage that may be a dynamic random access memory (DRAM) device, a static random access memory (SRAM) device, flash memory, or some other memory devices. In some embodiments, the storage also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 2:
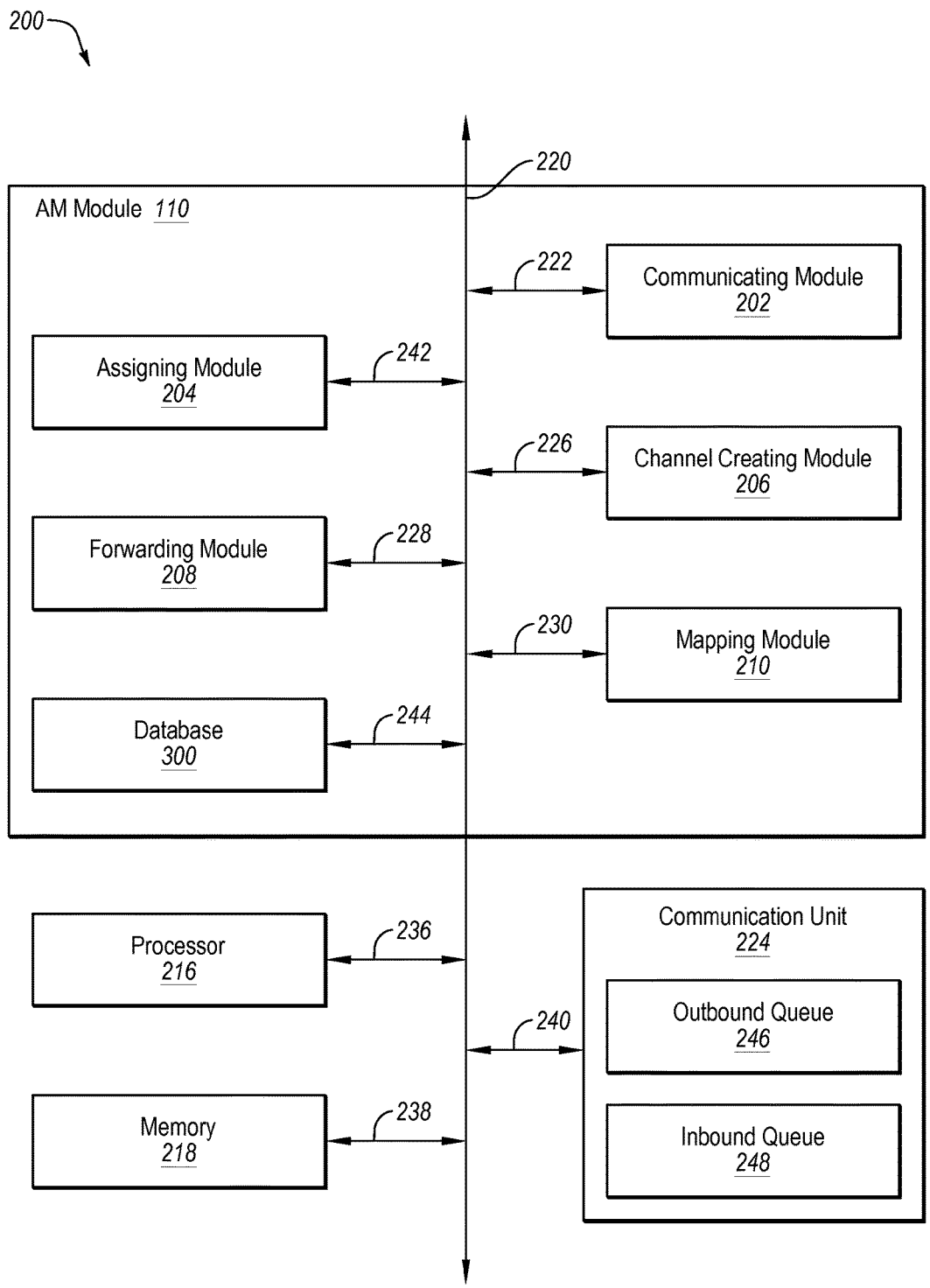
FIG. 2 illustrates an example AM module.

Referring now to FIG. 2, an example of the AM module 110 is shown in more detail. FIG. 2 is a block diagram of a computing device 200 that includes an AM module 110, a processor 216, a memory 218, and a communication unit 224 according to some embodiments. The components of the computing device 200 may be communicatively coupled by a bus 220. In some embodiments, the computing device 200 may be one of the network server 112, the proxy servers 114, or the devices 104 of FIG. 1.

With combined reference FIGS. 1 and 2, the processor 216 may include an arithmetic logic unit, a microprocessor, a general-purpose controller, or some other processor array to perform computations and provide electronic display signals to a display device. The processor 216 may be coupled to the bus 220 for communication with the other components via signal line 236. The processor 216 generally processes data signals and may include various computing architectures including a complex instruction set computer (CISC) architecture, a reduced instruction set computer (RISC) architecture, or an architecture implementing a combination of instruction sets. Although FIG. 2 includes a single processor 216, multiple processors may be included in the computing device 200. Other processors, operating systems, sensors, displays and physical configurations may be possible.

The memory 218 may be configured to store instructions and/or data that may be executed by the processor 216. The memory 218 may be coupled to the bus 220 for communication with the other components via signal line 238. The instructions and/or data may include code for performing the techniques or methods described herein. The memory 218 may be a dynamic random access memory (DRAM) device, a static random access memory (SRAM) device, flash memory, or some other memory device. In some embodiments, the memory 218 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 224 may be configured to transmit and receive data to and from at least one of the network server 112, the devices 104, and the proxy servers 114 depending upon where the AM module 110 is stored. The communication unit 224 is coupled to the bus 220 via signal line 240. In some embodiments, the communication unit 224 includes a port for direct physical connection to the network 132 or to another communication channel. For example, the communication unit 224 may include a USB, SD, CAT-5 or similar port for wired communication with the devices 104. In some embodiments, the communication unit 224 includes a wireless transceiver for exchanging data with the devices 104 or other communication channels using one or more wireless communication methods, including IEEE 802.11, IEEE 802.16, BLUETOOTH® or another suitable wireless communication method.

In some embodiments, the communication unit 224 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 224 includes a wired port and a wireless transceiver. The communication unit 224 may also provide other conventional connections to the network 132 for distribution of files and/or media objects using standard network protocols including TCP/IP, HTTP, HTTPS and SMTP, etc.

Additionally, in the depicted embodiment the communication unit 224 may include an inbound queue 248 and an outbound queue 246 (collectively, queues 248/246). Generally, the inbound queue 248 may be configured to receive communications from the network 132 and sequence the communications. The inbound queue 248 may communicate the communications to the AM module 110 via the bus 220 for processing. The outbound queue 246 may receive communications from the AM module 110 via the bus 220 and sequence the communications received from the AM module 110. The communication unit 224 may then extract the communications from the outbound queue 246 and send the communications to one or more of the devices 104, the network server 112, and the proxy servers 114. The queues 248/246 may include memory similar to the memory 218 in which the communications are stored. Moreover, the queues 248/246 may interface with the processor 216 to route communications from the queues 248/246 to and from the AM module 110.

In the embodiment shown in FIG. 2, the AM module 110 includes a communicating module 202, an assigning module 204, a channel creating module 206, a forwarding module 208, a mapping module 210, and a database 300. These components of the AM module 110 may be communicatively coupled to each other via the bus 220.

The communication module 202 can be software including routines for handling communications between the AM module 110 and other components of the computing device 200. In some embodiments, the communication module 202 can be a set of instructions executable by the processor 216 to provide the functionality described below for handling communications between the AM module 110 and other components of the computing device 200. In some instances, the communication module 202 can be stored in the memory 218 of the computing device 200 and can be accessible and executable by the processor 216. The communication module 202 may be adapted for cooperation and communication with the processor 216 and other components of the computing device 200 via signal line 222.

The communication module 202 may be configured to send and receive data, via the communication unit 224, to and from one or more of the devices 104, the network server 112, and the proxy servers 114. In some instances, the communication module 202 may cooperate with the other module 204, 206, and 208 to receive and/or forward, via the communication unit 224, messages, requests, and communications from components of the AM system 100.

The communication module 202 may receive, via the communication unit 224, a channel establishment request, a channel access request, a communication, an initial message, a deletion request, or any combination thereof, for example, from one or more of the parties 102.

In some embodiments, in response to the communication module 202 receiving a channel establishment request, the communication module 202 may send the channel establishment request to the channel creating module 206. The channel creating module 206 can be software including routines for generating and/or creating channels. The channel creating module 206 may communicate with other components of the computing device 200 via a signal line 226. In response to the channel establishment request or another similar signal indicating a channel is to be created, the channel creating module 206 may create a channel. In some embodiments, the channel may be associated with the actual address of the initial device 104A. After the channel is created, the channel creating module 206 may communicate a signal to the assigning module 204 indicating the channel has been created.

The assigning module 204 can be software including routines for assigning a channel address to a channel and/or assigning a proxy address to an actual address. The assigning module 204 may communicate with other components of the computing device 200 via a signal line 242. In response to the signal indicating the creation of the channel, or another similar signal indicating that a channel has been created, the assigning module 204 may assign a channel address to the channel. The channel address may be sent to the communicating module 202 and to the database 300. The communication module 202 may also the send the channel address to the initial party 102A via the outbound queue 246 of the communication unit 224.

After the channel is created, in response to the communication module 202 receiving a channel access request, the communication module 202 may send the channel access request to the assigning module 204. The channel access request may be received at the channel address from an actual address of the respondent device 104B, for example. The assigning module 204 may then assign a proxy address to the actual address of the respondent device 104B and a proxy address to the actual address of the initial device 104A with which the channel is associated. The assigning module 204 may then send the proxy addresses and the actual addresses to the communication module 202, the database 300, and to the mapping module 210. The communication module 202 may then send the proxy addresses to the actual addresses of the respondent device 104B and the initial device 104A, respectively. The proxy addresses may be sent via the outbound queue 246 and the communication unit 224.

The mapping module 210 can be software including routines for forming address pairs and mapping address pairs. The mapping module 210 may communicate with other components of the computing device 200 via a signal line 230. The mapping module 210 may form address pairs between the actual address and the assigned proxy addresses. The mapping module 210 may also map address pairs to one another for the channel. The mapping module 210 may then send the address pairs and mapping information (e.g., which address pair is mapped to which address pair) to the database 300.

The database 300 can be software including routines for storing and organizing data generated and communicated in the AM module 110 and the AM system 100. The database 300 may communicate with other components of the computing device 200 via a signal line 244. The database 300 may receive the channel address, the addresses, the address pairs, and the mapping information from one or more of the modules 202, 204, 206, and 210. The database 300 may then store the channel address, the addresses, the address pairs, and the mapping information.

After the addresses are mapped, and in response to the communication module 202 receiving a communication, the communication module 202 sends the communication to the forwarding module 208. The forwarding module 208 may ascertain the proxy address to which the communication is sent and the actual address from which the communication is sent. From the actual address and the proxy address, the forwarding module 208 may further ascertain the transmitting address pair that includes the actual address and the proxy address and the corresponding address pair that is mapped to the transmitting address pair. The forwarding module 208 may then use the corresponding address pair to forward the communication from the proxy address and to the actual address included in the corresponding address pair. Forwarding the communication to by the forwarding module 208 may include sending the communication to the communicating module 202, which may send the communication via the outbound queue 246 of the communication unit 224.

Alternatively, the forwarding module 208 may forward the communication to a proxy server (e.g., 114A or 114B). The proxy server may include a forwarding module that forwards the communication to the actual address from the proxy address of the address pair mapped to the transmitting address pair.

In some embodiments, in response to the communication unit 202 receiving an initial message, the communication unit 202 sends the initial message to the assigning module 204. The assigning module 204 may then associate the initial message with the channel and send the initial message to the database 300. The database 300 may then store the initial message. Subsequently, in response to a channel access request being received, the communication module 202 may then access the initial message and send the initial message to actual address of the device 104 from which the channel access request is sent.

In response to the communication unit 202 receiving a broadcast message, the communication unit 202 may send the broadcast message to the forwarding module 208. The forwarding module 208 may then forward the broadcast message to multiple actual addresses mapped to the channel.

In response to the communication unit 202 receiving a deletion request, the communication unit 202 may send the deletion request to the forwarding module 208 and the database 300. The forwarding module 208 may ascertain the proxy address to which the deletion message was sent and the actual address from which the deletion message was sent. The forwarding module may then disable communication between the address pair that includes the ascertained actual address and proxy address and any other address pair(s) mapped thereto. The database 300 may store an indication that communication between one or more address pairs has been disabled. By storing the indication, the AM module 110 may avoid a subsequent inclusion of the corresponding parties 102 in the channel.

FIGS. 3A-3D illustrate example tables 302 and 326A-326C that may be included in an embodiment of the database 300 of FIG. 2 or in the cache memories discussed with reference to FIG. 1. Generally, the database 300 may be included in the AM module 110 as depicted in FIG. 2. Alternatively, some or all of the database 300 may be included on one or more of the network server 112, the devices 104, the proxy servers 114, some combination thereof, or another server or device. FIG. 3A depicts an example channel table 302. The channel table 302 may include information and data related to multiple channels 304A-304C (generally channel 304 or channels 304) created in an AM system such as the AM system 100 of FIG. 1. FIGS. 3B-3D depict channel specific tables 326A-326C that may include information related to one of the channels 304 listed in the channel table 302.

With specific reference to FIG. 3A, for each of the channels 304, the channel table 302 may include a designation. For example, the channel table 302 includes a first channel 304A, a second channel 304B, and an nth channel 304C. Ellipses 360 in FIG. 3A indicate that the channel table 302 is not limited to three channels 304. Ellipses in FIGS. 3B-3D similarly indicate a lack of limitation in the number of parties associated with a particular channel 304.

Additionally, for each of the channels 304, the channel table 302 may include an initial party 306. Generally, the initial party 306 includes a party with which the channel is associated. In some embodiments, the initial party 306 may include a party that sent the channel establishment request or a party on behalf of which the channel establishment request is sent. For example, the initial party 306 may include the initial party 102A of FIG. 1. In the following description of FIGS. 3A-5, the initial party 102A is referred to as a first party 102A, the first respondent party 102B is referred to as a second party 102B, and the second respondent party 102C is referred to as a third party 102C.

Additionally, for each of the channels 304, the channel table 302 may include an actual address 308. The actual address 308 may be an actual address associated with the initial party 306 associated with the channel 304. For example, the actual address 308 may include an actual address of an initial device that is to be used by the initial party 306 for anonymous communication via the channel 304. In some embodiments, the actual address 308 may include the actual address of a device (e.g., device 104 of FIG. 1) from which a channel establishment request is sent and which is associated in some way with the initial party 306. Alternatively the actual address 308 may include a device referenced or otherwise indicated in the channel establishment request.

Additionally, for each of the channels 304, the channel table 302 may include a channel type 312. The channel type 312 may designate the type of channel, the type of addresses, whether a key code 310 may beneficial, or some combination thereof. In the depicted channel table 302, the first channel 304A includes a first channel type 312A "SMS", the second channel 304B includes a second channel type 312B "email", and the nth channel 304C includes an nth channel type 312C "voice communication." Additional channel types are listed elsewhere herein.

Additionally, for each of the channels 304, the channel table 302 may include a channel address 350. The channel address 350 may designate an address to which respondent parties may send a channel access request to participate in the channel. The channel address 350 corresponds to the channel type 312. For example, the channel address 350A of the first channel 304A is a multi-digit phone number on which SMS messages may be communicated.

Additionally, for each channel 304, the table 302 may include a key code 310. The key code 310 may include an alphanumeric token. The key code 310 is generally an additional identifier for one of the channels 304. The key code 310 may enable reuse or additional, concurrent use of channel addresses. In some embodiments, the key code 310 is used for the channels 304 in which the addresses are limited and/or expensive to create, such as unique phone numbers. Where a channel address 350 is combined with a key code 310, the channel address 350 may be assigned with differing key codes 310 to multiple channels. For instance, a first key code 310A "TIRES" is included for the first channel 304A which is a SMS channel and an nth key code 310C "Ext. 211" is included for the nth channel 304C which is a voice communication channel. However, in the second channel 304B no key code 310 is provided. In both the first channel 304A and the nth channel 304C, phone numbers may be limited and expensive. Thus, inclusion of the key code 310 may enable use of the same channel address 350 with different key codes 310. In contrast, email addresses are cheap and easy to create. Accordingly, the second channel 304B may not use a key code 310.

The key code 310 may be included in the channel establishment request or may be assigned by an AM module such as the AM module 110 of FIGS. 1 and 2. The key code 310 may also be included with the channel address 350 sent to an initial party 306. Thus, the initial party 306, when anonymously inviting respondent parties to communication over a channel, may include the channel address 350 and the key code 310, such as in an anonymous printed advertisement.

With reference to FIGS. 3B-3D, each of the channel-specific tables 326 include the addresses 308, 314, 320, and 318 and mapped address pairs 322 for each of the channels 304 included in FIG. 3A. Additionally, each of the channel-specific tables 326 may include information 324 that may be relevant with the channel 304.

A first channel table 326A of FIG. 3B is discussed in detail herein, however the discussion of the first channel table 326A also characterizes some of the features of a second channel table 326B of FIG. 3C and an nth channel table 326C of FIG. 3D.

The first channel table 326A depicted in FIG. 3B includes an initial party 306. The initial party 306 of the first channel table 326A corresponds to the initial party 306 in the channel table 302 of FIG. 3A. Specifically, for the first channel 304A, the initial party 306 is the first party 102A.

In the depicted first channel table 326A, the initial party 306 is listed as a party in every mapped address pair 322 in the first channel table 326A. For example, the first party 106A is included in a mapped address pair 322 with each of the respondents 316A-316D (generally, respondent 316 or respondents 316). In alternative embodiments, the respondents 316 may be mapped in address pairs 322 to multiple parties rather than to a single initial party 306.

Additionally, the first channel table 326A includes an actual address 308. The actual address 308 of the first channel table 326A corresponds to the actual address 308 in the channel table 302 of FIG. 3A. Specifically, for the first channel 304A, a first actual address 308A is "18012222222."

As discussed above, multiple proxy addresses may be assigned to the first actual address 308A. The first channel table 326A includes the proxy address 314 assigned to the first actual address 308A. In the depicted first channel table 326A, one of the proxy addresses 314A-314D is assigned to first actual address 308A for each of the mapped address pairs 322. In some alternative embodiments, one or more of the proxy addresses 314A-314D may be identical.

For each of the respondents 316, the first channel table 326A includes an actual address 320 and a proxy address 318. For example, a first actual address 320A may be associated with a first respondent 316, namely the second party 102B. Also, a first proxy address 318A may be assigned to the first actual address 320A.

With reference to the initial party 306 and the respondents 316, the actual addresses 308 and 320 and the proxy addresses 314 and 318, respectively, form address pairs. For example, for the first party 102A, the first channel table 326A includes four address pairs: the first actual address 308A paired with first, second, third, and nth proxy addresses 314A-314D. Additionally, for each of the respondents 316 the first channel table 326 includes one address pair.

The first channel table 326A also includes mapped address pairs 322. The mapped address pairs 322 are listed in a format "first actual address: first proxy address/second proxy address: second actual address." In other embodiments, the format of the mapped address pairs 322 may be different. The mapped address pairs 322 indicate that in response to a communication being received from a first actual address to a first proxy address, the communication is forwarded from a second proxy address to the second actual address.

The first channel table 326A also includes the information 324. The information 324 may include meta-information and/or channel designations that allow each of the parties (e.g., 306 and 316) in each of the mapped address pairs 322 to customize communications along the channel 304 in which she is included. The information 324 may be specific to a subset of the mapped address pairs 322, a party, a group of parties, may be relevant to all mapped address pairs 322 in the channel 304, or may be relevant to multiple channels 304. For example, the information 324 may include address pair-specific information, global information, channel-specific information, party-specific information, group-specific information, or any combination thereof.

The first channel table 326A includes an example of address pair-specific information. In the first channel table 326A a first and an nth address pair 322A and 322D include information 324A and 324D indicating that the first and the nth address pair 322A and 322D are disabled. The information 324A and 324D may result from a request sent from the first party 102A, the second party 102B, or the nth party 316D. For instance, the first party 102A or the second party 102B may send a deletion request for the first address pair 322A and the first party 102A or the nth party 316D may send a deletion request for the nth address pair 322D. Additionally, in some circumstances, a system operator or a moderator may disable communications of a mapped address pair 322.

The example address pair-specific information discussed above may be similar to party-specific information. A party-specific information example may include a deletion request from the second party 102B to disable one or more mapped address pairs 322 that include the first party 102A. Accordingly, the disable indication 324A may appear in each mapped address pair 322 in which the initial party 102A is mapped to the second party 102B regardless of the channel 304.

The second channel table 326B includes an example of channel-specific information. The second channel table 326B includes information 324 that includes an initial message 324E. The initial message 324E may be communicated to each of the mapped address pairs 322 in the second channel 304B. An initial message is usually established by an initial party 306. However, alternative channel-specific information may be established by any party 306 or 316 included in a channel 304. Additionally, a channel-specific message may be established by a system operator that hosts the channels 304 (e.g., a welcome message) or a channel moderator that may oversee multiple channels 304. An example of a channel with multiple instances of channel-specific information may include a chat room channel. Alternatively, in some embodiments, the initial message may be communicated to each of the mapped address pairs 322 regardless of channel 304, which may be an example of global information.

The third channel table 326C includes examples of group-specific information. With reference to FIG. 3D, the information 324 includes a first broadcast message 324I that is included in a second and a third mapped address pair 322J and 322K and a second broadcast message 324J included in a first and an nth mapped address pairs 322I and 322L. The first broadcast message 324I may be communicated to a first subset of the mapped address pairs 322 (e.g., the second and the third mapped address pair 322J and 322K) or any combination of the mapped address pairs 322 and the second broadcast message 324J may be communicated to a second subset of the mapped address pairs 322 (e.g., the first and the nth mapped address pairs 322I and 322L) or any combination of the mapped address pairs 322. The group-specific information may be requested by any party 306 or 316, for reception by any other party 306 or 316.

Likewise, the first channel table 326A may also include group-specific information. The group-specific information may include a deletion request from the first party 102A to disable to one or more mapped address pairs 322 that include the second party 102B or the nth party 316D. Accordingly, the disable indication 324A and 324D may appear in each mapped address pair 322 in which the initial party 102A is mapped to the second party 102B regardless of the channel 304. In the example referencing the first channel table 326A, the group includes one or more parties 316, while in the examples depicted in FIG. 3D the groups includes one or more mapped address pairs 322.

The information 324 may be received by an AM module such as the AM module 110 of FIGS. 1 and 2. The information 324 may result from requests sent by the parties 102, moderators, system administrators, and the like. With reference to FIGS. 1 and 3A-3E, in some embodiments the requests that result in the information 324 may be received by the website 126, the communication application 130, or received from one of the devices 104 via the network 132.

Some other types of information may include, but are not limited to, a suspension indication that may include a particular duration, a highlighted indication, a mute indication, a handle indication, and a status indication. The suspension indication may identify mapped address pair(s) and/or parties in which communication is suspended for the particular duration. The highlighted indication may identify address pair(s) and/or parities that include a preferred party or a moderator. The mute indication may identify address pair(s) and/or parties from which communications are muted. The handle indication may identify a memorable mapped address pair or party. The status indication may indicate a party or address pair with a particular status such as moderator, subscriber, administrator, and the like. Each of the types of information may result from a request sent by any party or in some circumstances a system operator or moderator.

In some alternative embodiments of the database 300, the channel table 302 may include information 324 that includes global and/or channel-specific information. For example, the channel table 302 may include another column that includes global and/or channel-specific information communicated to each party 102 included in one or more of the channels 304.

Figure 4A:
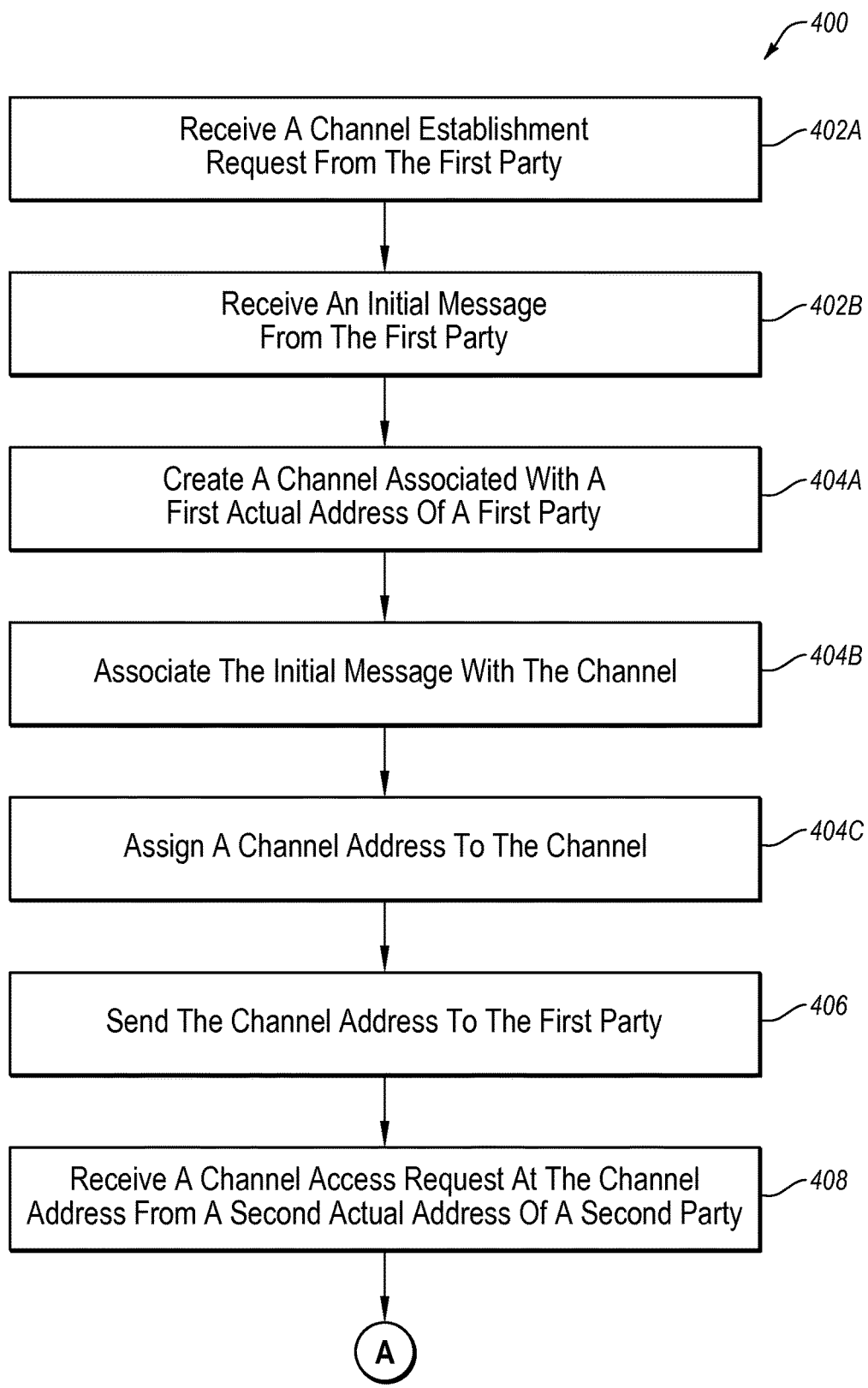
FIGS. 4A-4C and FIG. 5 are flow diagrams of an example method of facilitating anonymous communication between parties, all arranged in accordance with at least one embodiment described herein.
Figure 4B:
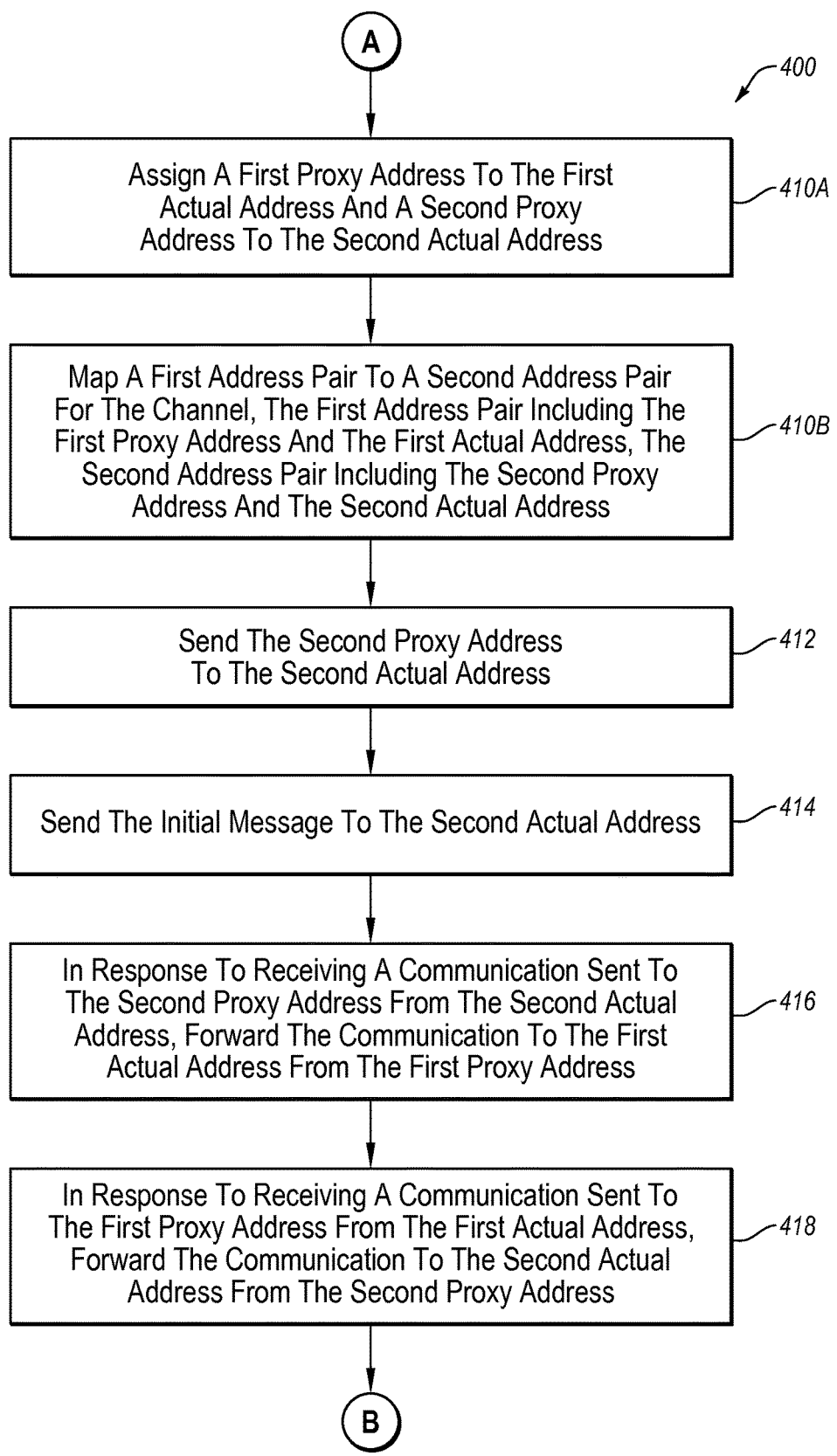
Figure 4C:
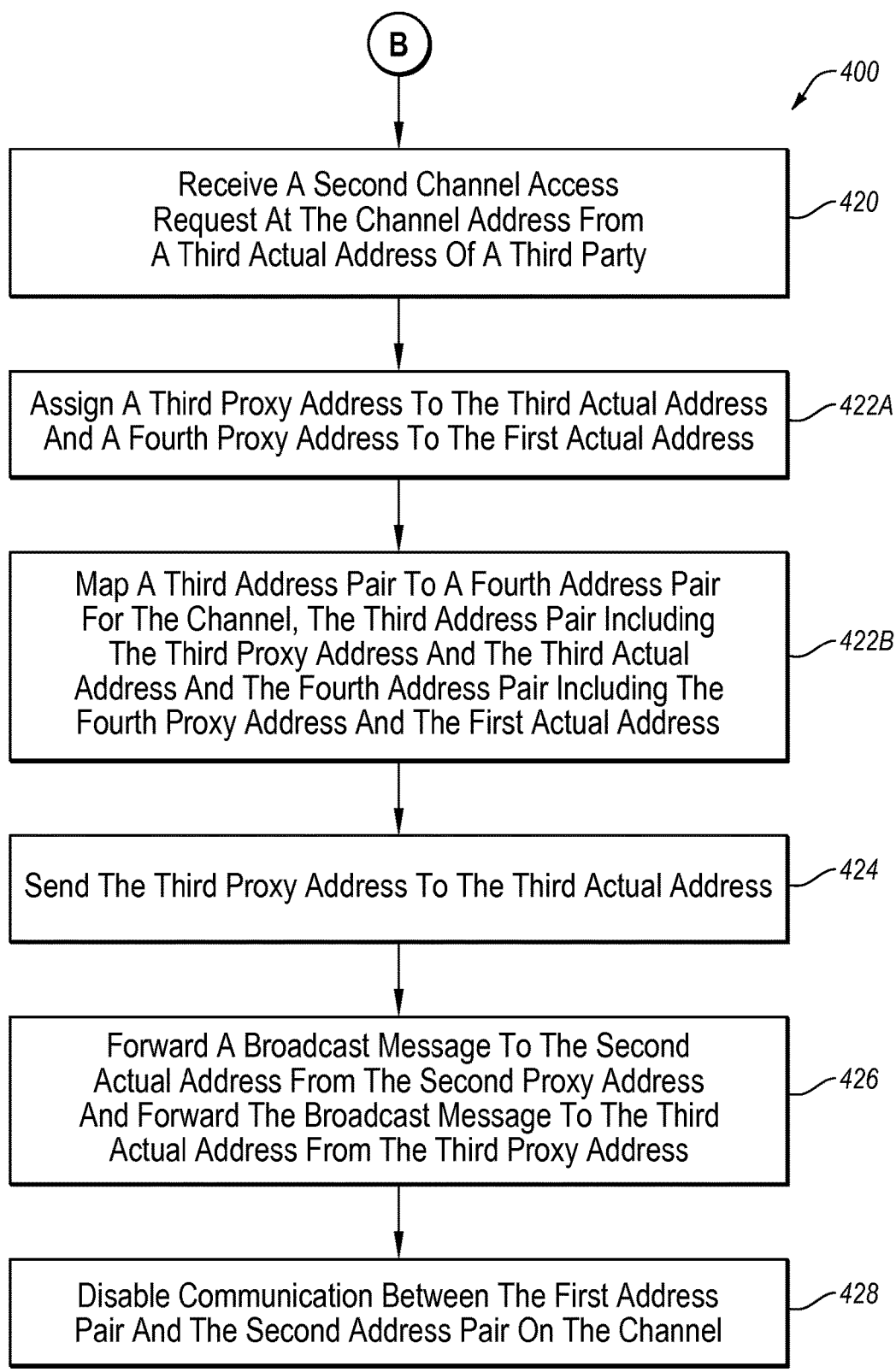
Figure 5:
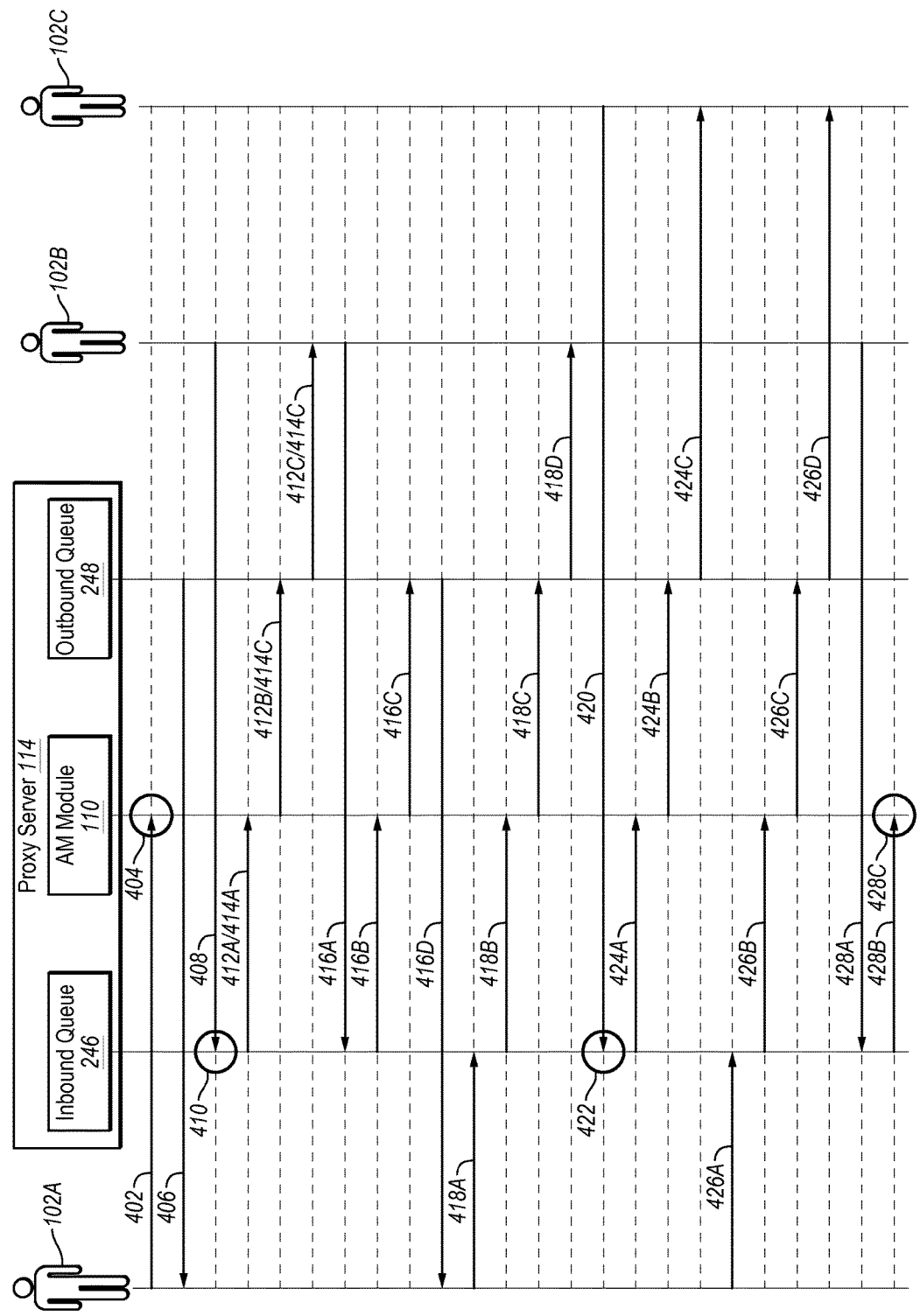

FIGS. 4A-4C and FIG. 5 are flow diagrams of an example method 400 of facilitating anonymous communication between parties, arranged in accordance with at least one embodiment described herein. The method 400 may be performed in an AM system such as the AM system 100 of FIG. 1. The method 400 may be programmably performed in some embodiments by the computing system 200 described with reference to FIG. 2. In particular, in FIG. 5, the method 400 is described with reference to the proxy server 114 of FIG. 1 including the AM module 110, the outbound queue 248 and the inbound queue 246 described with reference to computing system 200. In some embodiments, the computing system 200 may include or may be communicatively coupled to a non-transitory computer-readable medium (e.g., the memory 218 of FIG. 2) having stored thereon programming code or instructions that are executable by the computing system 200 (such as the proxy server 114) to cause the computing system 200 to perform the method 400. Additionally or alternatively, the computing system 200 may include the processor 216, described above in connection with FIG. 2, which is configured to execute computer instructions to cause the computing system 200 to perform the method 400. Although the method 400 is illustrated in FIGS. 4A-4C as discrete blocks, various blocks may be divided into additional blocks, combined into fewer blocks, or eliminated, depending on the desired implementation. The method 400 is described with reference to flow charts in both FIGS. 4A-4C and FIG. 5 concurrently. In FIG. 5, the parties 102, the proxy server 114, and communications therebetween are included.

The method 400 may begin at 402 (FIG. 5) with a communication from the first party 102A to the AM module 110. The step 402 may include one or more steps. For example, at 402A (FIG. 4A), a channel establishment request may be received from the first party 102A and then at 402B (FIG. 4A), an initial message may be received from the first party 102A. The channel establishment request and the initial message may be received at the AM module 110.

For example, with reference to FIG. 1, the first party 102A may be selling a set of tires. The first party 102A may want to set up channel over which parties 102 who are interested in the tires may anonymously communicate via email. The first party 102A may accordingly communicate an email message including the channel establishment request (e.g., "Please establish a channel for me") and the initial message (e.g., "four all-weather R14 tires, $100 firm") to the AM module 110D via the network 132. The email may be authored using the initial device 104A or directly input to the AM module 110D via the website 126, or some combination thereof.

At 404 (FIG. 5), the AM module 110 may create a channel. The step 404 may include one or more steps. For example, at 404A (FIG. 4A), a channel associated with a first actual address of the first party 102A may be created, at 404B (FIG. 4A), the initial message may be associated with the channel, and at 404C (FIG. 4A), a channel address may be assigned to the channel.

Continuing the above tire-sales example, the AM module 110D of the first proxy server 114A may create a second channel 304B associated with the actual email address 308B of the first party 102A, "user1@gmail.com", as disclosed in FIG. 3A. The initial message 324E (e.g., "four all-weather R14 tires, $100 firm") may be associated with the channel 304B and a channel address 350B, namely "chan2@smsm.com", may be assigned to the channel 304B by the AM module 110D, as disclosed in FIGS. 3A and 3C.

At 406 (FIGS. 4A and 5), the channel address may be sent to the first party 102A. In the above example, the channel address 350B may be the email address "chan2@smsm.com" which is associated with channel 304B. The first party 102A may then include the channel address 350B in her advertisement. The AM module 110 may send the channel address 350B to the initial party device 104A of the first party 102A via the network 132 or may send the channel address 350B to the first party 102A via the website 126, for example.

At 408 (FIGS. 4A and 5), a channel access request may be received from a second actual address of the second party 102B. In the above example, the second party 102B may see the advertisement including the channel address 350B. The second party 102B may send a channel access request email from the actual address 320E, namely "resp1@msn.com", using the first respondent device 104A to the channel address 350B, as disclosed in FIG. 3C. The channel access request email may communicate the channel access request to the AM module 110D of the first proxy server 114A via the network 132.

At 410 (FIG. 5), the addresses of the first party 102A and the second party 102B may be organized. Step 410 may include one or more steps. For example, at 410A (FIG. 4B), a first proxy address may be assigned to the first actual address and a second proxy address may be assigned to the second actual address and, at 410B (FIG. 4B), a first address pair may be mapped to a second address pair for the channel. The first address pair may include the first proxy address and the first actual address and the second address pair may the second proxy address and the second actual address.

Continuing the above tire-sales example, the AM module 110D of the first proxy server 114A may assign the proxy email address 314E, namely "user2@amsm.com", to the actual email address 308B of the first party 102A, namely "user1@gmail.com", and also assign the proxy email address 318E, namely "user6@amsm.com", to the actual email address 320E, namely "resp1@msn.com", of the second party 102B. The first address pair may include the proxy email address 314E and the actual email address 308B of the first party 102A. The second address pair may include the proxy email address 318E and the actual email address 320E of the second party 102B. The first address pair may then be mapped to the second address pair.

At 412 (FIG. 4B), the second proxy address may be sent to the second actual address. The step 412 may include one or more steps. For example, at 412A (FIG. 5), the inbound queue of the proxy server 114 may send the second proxy address to the AM module 110, at 412B (FIG. 5), the AM module 110 may then send the second proxy address to the outbound queue 248, and at 412C (FIG. 5), the outbound queue may send the second proxy address to the second party 102B.

Continuing the above tire-sales example, the proxy address 318E, namely "user6@amsm.com", may be sent to the actual address 320E, namely "resp1 @msn.com", by simply sending an introductory email message from "user6@amsm.com" to "resp1@msn.com". Alternatively, an introductory email message may be sent from another email address, but include within the email message the proxy address 318E.

At 414 (FIG. 4B), the initial message may be sent to the second actual address. The step 414 may include one or more steps. For example, at 414A (FIG. 5), the inbound queue of the proxy server 114 may send the initial message to the AM module 110, at 414B (FIG. 5), the AM module 110 may then send the initial message to the outbound queue 248, and at 414C (FIG. 5), the outbound queue may send the initial message to the second party 102B.

Continuing the above tire-sales example, the initial message 324E (e.g., "four all-weather R14 tires, $100 firm") may be sent to the actual address 320E by simply sending an introductory email message from "user6@amsm.com" to "resp1@msn.com" that includes the initial message 324E. Alternatively, an introductory email message may be sent from another email address, but include within the email message the initial message 324E.

At 416 (FIG. 4B), a communication may be forwarded to the first actual address from the first proxy address in response to receiving a communication sent to the second proxy address from the second actual address. The step 416 may include one or more steps. For example, at 416A (FIG. 5), the second party 102B may send an email to the second proxy address that is received by the inbound queue 246, at 416B (FIG. 5), the inbound queue 246 may send the communication to the AM module 110, at 416C (FIG. 5), the communication is sent to the outbound queue 248, and at 416D (FIG. 5), the communication may be forwarded to the actual address of first party 102A from the first proxy address.

Continuing the above tire-sales example, the second party 102B may send an e-mail message to the proxy email address 318E from the actual email address 320E. The AM module 110D of the first proxy server 114A may receive the email message. The AM module 110D may then forward the email message to the actual email address 308B of the first party 102A from the proxy email address 314E.

At 418 (FIG. 4B), a communication may be forwarded to the second actual address from the second proxy address in response to receiving the communication sent to the first proxy address from the first actual address. The step 418 may include one or more steps. For example, at 418A (FIG. 5), the first party 102A may send an email to the first proxy address that is received by the inbound queue 246, at 418B (FIG. 5), the inbound queue 246 may send the communication to the AM module 110. At 418C (FIG. 5), the communication is sent to the outbound queue 248, and at 418D (FIG. 5), the communication may be forwarded to the actual address of second party 102B from the second proxy address.

Continuing the above tire-sales example, the first party 102A may send an e-mail message to the proxy email address 314E from the actual email address 308B. The AM module 110D of the first proxy server 114A may receive the email message. The AM module 110D may then forward the email message from the proxy email address 318E to the actual email address 320E of the second party 102A.

At 420 (FIGS. 4C and 5), a channel access request may be received from a third actual address of the third party 102C. In the above example, the third party 102C may see the advertisement including the channel address 350B. The third party 102C may then send a channel access request email from the actual address 320F, namely "resp2@gmail.com", using the second respondent device 104B to the channel address 350B, namely "chan2@smsm.com". The channel access request email may communicate the channel access request to the AM module 110D of the first proxy server 114A via the network 132.

At 422 (FIG. 5), the addresses of the first party 102A and the third party 102C may be organized. Step 422 may include one or more steps. For example, at 422A (FIG. 4C), a third proxy address may be assigned to the third actual address and a fourth proxy address may be assigned to the first actual address and, at 422B (FIG. 4C), a third address pair may be mapped to a fourth address pair for the channel. The third address pair may include the third proxy address and the third actual address and the fourth address pair may the fourth proxy address and the first actual address.

Continuing the above tire-sales example, the AM module 110D of the first proxy server 114A may assign the proxy email address 314F, namely "user3@amsm.com", to the actual email address 308B of the first party 102A, namely "user1@gmail.com", and also assign the proxy email address 318F, namely "user7@amsm.com", to the actual email address 320F, namely "resp2@gmail.com", of the third party 102C. The fourth address pair may include the proxy email address 314F and the actual email address 308B of the first party 102A. The third address pair may include the proxy email address 318F and the actual email address 320F of the third party 102C. The third address pair may then be mapped to the fourth address pair.

At 424 (FIG. 4C), the third proxy address may be sent to the third actual address. The step 424 may include one or more steps. For example, at 424A (FIG. 5), the inbound queue 246 of the proxy server 114 may send the third proxy address to the AM module 110, at 424B (FIG. 5), the AM module 110 may then send the third proxy address to the outbound queue 248, and at 424C (FIG. 5), the outbound queue 248 may send the third proxy address to the third party 102C.

Continuing the above tire-sales example, the proxy address 318F, namely "user7@amsm.com", may be sent to the actual address 320F, namely "resp2@gmail.com", by simply sending an introductory email message from "user7@amsm.com" to "resp2@gmail.com". Alternatively, an introductory email message may be sent from another email address, but include within the email message the proxy address 318F.

At 426 (FIG. 4C), in response to receiving a broadcast message from the first actual address, the broadcast message may be forwarded to the second actual address from the second proxy address and to the third actual address from the third proxy address. The step 426 may include one or more steps. For example, at 426A (FIG. 5), the first party 102A may communicated a broadcast message to the inbound queue 246, at 426B (FIG. 5), the inbound queue 246 may send the broadcast message to the AM module 110, at 426C (FIG. 5), the AM module 110 may send the broadcast message to the outbound queue 248, and at 426D (FIG. 5), the outbound queue 248 may forward the broadcast message to the second actual address from the second proxy address and to the third actual address from the third proxy address.

Continuing the above tire-sales example, the first party 102A may want to anonymously communicate a single email message to both the second party 102B and the third party 102C. The first party 102A may therefore communicate a broadcast email message by sending a single email message to both the proxy email address 314E and the proxy e-mail address 314F, or by sending a single broadcast email message with a broadcast indicator or setting. The AM module 110D of the first proxy server 114A may then forward the broadcast email message to the actual email address 320E from the proxy email address 318E and to the actual email address 320F from the proxy email address 218F.

At 428 (FIG. 4C), communication between the first address pair and the second address pair on the channel may be disabled in response to receiving a deletion request sent to the first proxy address from the first actual address or sent to the second proxy address from the second actual address. The step 428 may include one or more steps. For example, at 428A (FIG. 5), the deletion request may be communicated to the inbound queue 246, at 428B (FIG. 5), the inbound queue 246 may send the deletion request to the AM module 110, and at 428C (FIG. 5), the AM module 110 may disable communication between the first address pair and the second address pair.

Continuing the above tire-sales example, when the second party 102B and the third party 102C have lost interest in the tires, or the first party 102A no longer wants to receive communications from the second party 102B or the third party 102C, the first party 102A or the second party 102B or the third party 102C may communicate a deletion request email to the AM module 110D of the first proxy server 114B. The AM module 110D may disable communication between the party sending the deletion request email and the party 102 or parties 102 indicated in the deletion request email. Thus, a deletion request email can disable any of the rows in the table 326B of FIG. 3C.

The above example includes an embodiment in which the channel is an email message channel and the addresses are email addresses. In some alternative embodiments, the channel may be a SMS channel or a voice communication channel, for example. In these and other embodiments, the channel address, the channel establishment, the channel access request, or some combination thereof may include a key code.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module," "component," and/or "engine" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method of anonymous communication between parties, the method comprising:
   receiving, by an anonymous message (AM) proxy server, a channel establishment request from a first party;
   creating, by the AM proxy server, the requested channel, the requested channel being associated with a first actual address that is associated with the first party and having a channel address that is included in a plurality of addresses on the AM proxy server;
   communicating, by the AM proxy server, the channel address to the first actual address such that the first party has access to the channel address;
   following a publication of the channel address by the first party, receiving, by the AM proxy server, a channel access request at the channel address from a second actual address that is associated with a second party;
   in response to the channel access request, assigning, by the AM proxy server, a first proxy address to the first actual address and a second proxy address to the second actual address, the first proxy address and the second proxy address being included in the plurality of addresses on the AM proxy server;
   mapping, by the AM proxy server, a first address pair to a second address pair for the channel, the first address pair including the first proxy address and the first actual address, the second address pair including the second proxy address and the second actual address, the mapping configured such that a message received from the first actual address at the first proxy address is forwarded by the AM proxy server to the second actual address from the second proxy address and a message received from the second actual address at the second proxy address is forwarded by the AM proxy server to the first actual address from the first proxy address;
   sending, by the AM proxy server, the second proxy address to the second actual address and the first proxy address to the first actual address; and
   in response to the AM proxy server receiving a message at the second proxy address from the second actual address, forwarding, by the AM proxy server, the message to the first actual address from the first proxy address.

2. The method of claim 1, further comprising, in response to the AM proxy server receiving a message sent to the first proxy address from the first actual address, forwarding, by the AM proxy server, the message to the second actual address from the second proxy address.

3. The method of claim 1, further comprising disabling communication between the first address pair and the second address pair on the channel in response to receiving a deletion request sent to the first proxy address from the first actual address or sent to the second proxy address from the second actual address.

4. The method of claim 1, further comprising:
   receiving a second channel access request at the channel address from a third actual address of a third party;
   assigning a third proxy address to the third actual address and a fourth proxy address to the first actual address;
   mapping a third address pair to a fourth address pair for the channel, the third address pair including the third proxy address and the third actual address, the fourth address pair including the fourth proxy address and the first actual address; and
   sending the third proxy address to the third actual address.

5. The method of claim 4, further comprising, in response to receiving a broadcast message from the first actual address:
   forwarding the broadcast message to the second actual address from the second proxy address; and
   forwarding the broadcast message to the third actual address from the third proxy address.

6. The method of claim 4, further comprising establishing the channel as an anonymous chat room in which one or more or a combination of the third party, the first party, the second party communicate.

7. The method of claim 4, further comprising disabling communication between the first address pair and the second address pair and/or between the third address pair and the fourth address pair in response to receiving a deletion request sent to the first proxy address and/or to the fourth proxy address from the first actual address.

8. The method of claim 1, further comprising:
   receiving an initial message from the first party;
   associating the initial message with the channel; and
   sending the initial message to the second actual address in response to the receiving the channel access request at the channel address from the second actual address of the second party.

9. The method of claim 1, wherein the channel access request includes a short code key, an alphanumeric token, or some combination thereof.

10. The method of claim 1, wherein:
    the channel includes a short message service (SMS) channel and the addresses include multi-digit mobile phone numbers;
    the channel is an email message channel and the addresses are email addresses; or
    the channel is a voice communication channel and the addresses are phone numbers.

11. An anonymous message (AM) system configured for anonymous communication between parties, the AM system comprising:
    an AM proxy server including one or more processors and a non-transitory computer-readable medium having thereon computer-readable instructions which, in response to execution by the one or more processors, cause the one or more processors to perform or cause the one or more processors to control performance of operations comprising:
       receiving a channel establishment request from a first party;
       creating the requested channel, the requested channel being associated with a first actual address that is associated with the first party and having a channel address that is included in a plurality of addresses on the AM proxy server;
       communicating the channel address to the first actual address such that the first party has access to the channel address;
       following a publication of the channel address by the first party, receiving a channel access request at the channel address from a second actual address that is associated with a second party;
       in response to the channel access request, assigning a first proxy address to the first actual address and a second proxy address to the second actual address, the first proxy address and the second proxy address being included in the plurality of addresses on the AM proxy server;

mapping a first address pair to a second address pair for the channel, the first address pair including the first proxy address and the first actual address, the second address pair including the second proxy address and the second actual address, the mapping configured such that a message received from the first actual address at the first proxy address is forwarded to the second actual address from the second proxy address and a message received from the second actual address at the second proxy address is forwarded to the first actual address from the first proxy address;

sending the second proxy address to the second actual address and the first proxy address to the first actual address; and in response to receiving a message at the second proxy address from the second actual address, forwarding the message to the first actual address from the first proxy address.

12. The AM system of claim 11, wherein the operations further comprise, in response to receiving a message sent to the first proxy address from the first actual address, forwarding the message to the second actual address from the second proxy address.

13. The AM system of claim 11, wherein the operations further comprise disabling communication between the first address pair and the second address pair on the channel in response to receiving a deletion request sent to the first proxy address from the first actual address or sent to the second proxy address from the second actual address.

14. The AM system of claim 11, wherein the operations further comprise:

receiving a second channel access request at the channel address from a third actual address of a third party;

assigning a third proxy address to the third actual address and a fourth proxy address to the first actual address;

mapping a third address pair to a fourth address pair for the channel, the third address pair including the third proxy address and the third actual address, the fourth address pair including the fourth proxy address and the first actual address; and sending the third proxy address to the third actual address.

15. The AM system of claim 14, wherein the operations further comprise, in response to receiving a broadcast message from the first actual address:

forwarding the broadcast message to the second actual address from the second proxy address; and forwarding the broadcast message to the third actual address from the third proxy address.

16. The AM system of claim 14, wherein the operations further comprise establishing the channel as an anonymous chat room in which one or more or a combination of the third party, the first party, the second party communicate.

17. The AM system of claim 11, wherein the operations further comprise:

receiving an initial message from the first party;

associating the initial message with the channel; and sending the initial message to the second actual address in response to the receiving the channel access request at the channel address from the second actual address of the second party.

18. The AM system of claim 11, wherein:

the channel includes a short message service (SMS) channel and the addresses include multi-digit mobile phone numbers;

the channel is an email channel and the addresses are email addresses; or the channel is a voice communication channel and the addresses are phone numbers.

19. The AM system of claim 11, further comprising a second AM proxy server, the second proxy server being remotely located from the AM proxy server, wherein the operations further comprise:

forwarding a first communication to the second AM proxy server via a second communication network in response to the AM proxy server receiving the first communication sent to the second proxy address from the second actual address via a first communication network; and forwarding a second communication to the second actual address from the second proxy address via the first communication network in response to receiving the second communication sent from the second AM proxy server via the second communication network, the second communication being previously sent to the first proxy address from the first actual address.

20. The AM system of claim 11, wherein the channel access request includes a short code key, an alphanumeric token, or some combination thereof.

* * * * *